United States Patent
Yairi

(10) Patent No.: US 9,588,684 B2
(45) Date of Patent: Mar. 7, 2017

(54) TACTILE INTERFACE FOR A COMPUTING DEVICE

(71) Applicant: Tactus Technology, Inc., Fremont, CA (US)

(72) Inventor: Micah Yairi, Fremont, CA (US)

(73) Assignee: Tactus Technology, Inc., Hayward, CA (US)

(*) Notice: Subject to any disclaimer, the term of this patent is extended or adjusted under 35 U.S.C. 154(b) by 24 days.

(21) Appl. No.: 14/815,771

(22) Filed: Jul. 31, 2015

(65) Prior Publication Data

US 2016/0179272 A1 Jun. 23, 2016

Related U.S. Application Data

(60) Provisional application No. 62/031,783, filed on Jul. 31, 2014.

(51) Int. Cl.
*G06F 3/041* (2006.01)
*G06F 3/0488* (2013.01)

(52) U.S. Cl.
CPC ............ *G06F 3/04886* (2013.01); *G06F 2203/04809* (2013.01)

(58) Field of Classification Search
CPC ........................... G06F 3/044; G06F 3/041
See application file for complete search history.

(56) References Cited

U.S. PATENT DOCUMENTS

| | | |
|---|---|---|
| 2,885,967 A | 5/1959 | C et al. |
| 3,034,628 A | 5/1962 | Wadey |
| 3,441,111 A | 4/1969 | P |
| 3,453,967 A | 7/1969 | L et al. |
| 3,490,733 A | 1/1970 | Jean |

(Continued)

FOREIGN PATENT DOCUMENTS

| | | |
|---|---|---|
| CN | 1260525 A | 7/2000 |
| CN | 1530818 A | 9/2004 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Olga Merkoulova
(74) *Attorney, Agent, or Firm* — Jeffrey Schox; Padowithz Alce

(57) ABSTRACT

A tactile interface for a computing device includes a tactile layer defining a primary guide and a secondary guide. The primary guide is tactilely distinguishable from an adjacent peripheral region and arranged adjacent a first input region of a touch-sensitive surface. The secondary guide is tactilely distinguishable from the adjacent peripheral region, arranged adjacent a second input region of the touch-sensitive surface, and defines a peripheral boundary of a range of motion of a finger moving between the primary guide and the secondary guide. The first input region is independent from the primary guide, the second input region independent from the secondary guide.

21 Claims, 5 Drawing Sheets

(56) References Cited

U.S. PATENT DOCUMENTS

| | | |
|---|---|---|
| 3,659,354 A | 5/1972 | Sutherland |
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,181,476 A | 1/1980 | Malbec |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 4,980,646 A | 12/1990 | Zemel |
| 5,090,297 A | 2/1992 | Paynter |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,470,212 A | 11/1995 | Pearce |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |

(56) References Cited

U.S. PATENT DOCUMENTS

| | | |
|---|---|---|
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |

(56) References Cited

U.S. PATENT DOCUMENTS

| | | |
|---|---|---|
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 9,372,539 B2 | 6/2016 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2003/0234769 A1 | 12/2003 | Cross et al. |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |

(56) References Cited

U.S. PATENT DOCUMENTS

| | | |
|---|---|---|
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0191402 A1 | 7/2009 | Beiermann et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0244947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1* | 10/2011 | Ciesla .................. G06F 3/016 345/173 |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1* | 5/2012 | Maschmeyer .......... G06F 3/016 345/173 |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1* | 9/2012 | Ciesla .................. G06F 3/0202 345/173 |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0241718 A1 | 9/2013 | Wang et al. |
| 2013/0275888 A1 | 10/2013 | Williamson et al. |
| 2014/0034469 A1 | 2/2014 | Krumpelman |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| CN | 201130336 | 10/2008 |
| EP | 2000884 A1 | 12/2008 |
| EP | 2348801 A2 | 7/2011 |
| EP | 2936476 A1 | 10/2015 |
| GB | 190403152 | 0/1904 |
| GB | 108771 A | 8/1917 |
| GB | 1242418 A | 8/1971 |
| JP | s63164122 A | 7/1988 |
| JP | 06125188 A | 6/1994 |
| JP | 10255106 | 9/1998 |
| JP | H10255106 | 9/1998 |
| JP | 2004111829 A | 4/2004 |
| JP | 2004178117 A | 6/2004 |
| JP | 2004303268 A | 10/2004 |
| JP | 2006053914 A | 1/2005 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| JP | 2014526106 A | 10/2014 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |

(56) References Cited

FOREIGN PATENT DOCUMENTS

| WO | 2009088985 A1 | 7/2009 |
|---|---|---|
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2012054781 A1 | 4/2012 |
| WO | 2013022805 A1 | 2/2013 |
| WO | 2013173624 A2 | 11/2013 |
| WO | 2014047656 A2 | 3/2014 |
| WO | 2014095935 A1 | 6/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

* cited by examiner

TACTILE INTERFACE FOR A COMPUTING DEVICE

CROSS-REFERENCE TO RELATED APPLICATIONS

This application claims the priority benefit of U.S. Provisional Patent Application No. 62/031,783, filed on 31 Jul. 2014, which is incorporated in its entirety by this reference.

This application is related to U.S. patent application Ser. No. 12/319,334, filed on 5 Jan. 2009; U.S. patent application Ser. No. 12/497,622, filed on 21 Oct. 2009; and U.S. patent application Ser. No. 12/652,708, filed on 5 Jan. 2010, all of which are incorporated in their entireties by this reference.

TECHNICAL FIELD

This invention relates generally to the field of touch-sensitive interfaces, and more specifically to a touch-sensitive layer for a computing device.

DESCRIPTION OF THE PREFERRED EMBODIMENTS

The following description of the preferred embodiment of the invention is not intended to limit the invention to these preferred embodiments, but rather to enable any person skilled in the art to make and use this invention.

1. Tactile Interface

Figure 1:
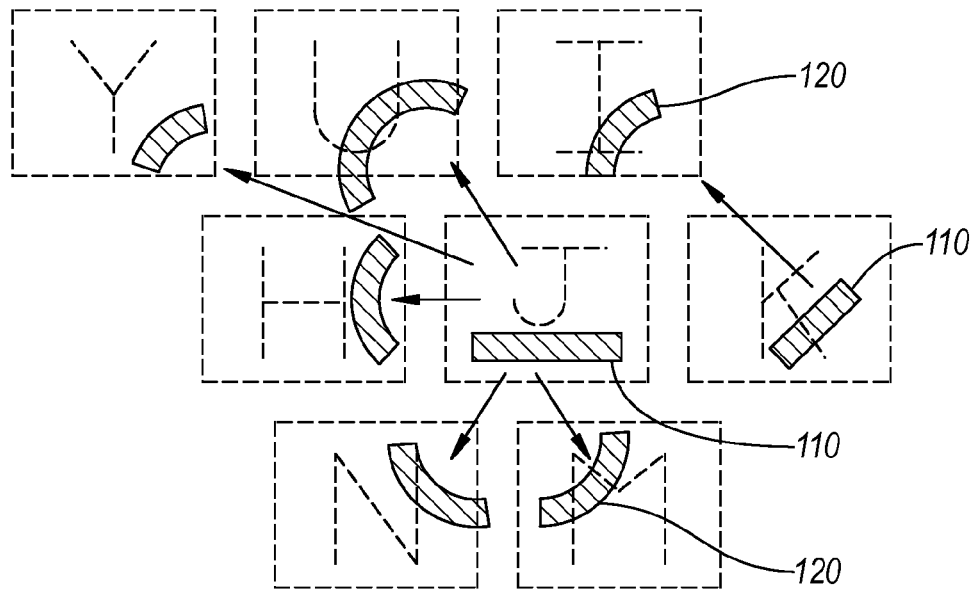
FIG. 1 is a schematic representation of one implementation of the tactile interface.

As shown in FIG. 1, a tactile interface for a computing device includes: a tactile layer defining a primary guide and a secondary guide, the primary guide tactilely distinguishable from an adjacent peripheral region and arranged adjacent a first input region of a touch-sensitive surface, the secondary guide tactilely distinguishable from the adjacent peripheral region, arranged adjacent a second input region of the touch-sensitive surface, and defining a peripheral boundary of a range of motion of a finger moving between the primary guide and the secondary guide, the first input region independent from the primary guide, the second input region independent from the secondary guide. The touch sensitive surface may or may not include a sensor, such as a capacitive sensor, and may include a pressure-sensing mechanism within a button or other structure associated with a primary or secondary guide.

Generally, the tactile interface functions to define tactile locations on the tactile interface that provide reference locations indicating a relative position of the finger on the tactile interface. The tactile interface defines the primary guide and the secondary guide, the guides aiding contact with specified locations of the tactile layer. The primary guide can indicate a home position on which a finger rests when idle, from which the finger transitions to contact the secondary guide, and to which the finger translates following contact with the second locations. The secondary guide can indicate another location peripheral the home position within a range of motion of the finger that translates from the primary guide, and the secondary guide can guide the finger to the other position. Thus, the primary guide and secondary guide improve ergonomics of user interactions with a computing device incorporating the tactile interface.

2. Applications

In one application, the tactile interface is integrated in a computing device and arranged over a display of the computing device. The tactile interface can be substantially transparent or translucent. The tactile interface can define a primary guide with corresponding secondary guides arranged around the primary guide. The primary guide can correspond to a location on the tactile layer defining a home position for a finger or other input device. The home position can indicate tactilely to a user interacting with the tactile interface the location of the user's finger on the tactile interface. With knowledge of the location of the finger from tactile contact with the primary guide, the user can, thus, discern relative positions of secondary locations on the tactile interface that surround the primary guide. The secondary guides, which correspond to the secondary locations, can indicate and guide the user's finger from the primary guide to the any of the secondary locations.

In another application, the primary guide can be arranged substantially over or adjacent an image of an input key within a keyboard rendered on the display (e.g., an "F" or a "J" key image). The primary guide, such as defining a hemispheric protrusion from a tactile surface of the tactile interface, can be arranged over the input image of the key. Thus, the primary guide can act as a tactile indicator of the home position for fingers of a user, who types with ten fingers on the tactile layer. A plurality of primary guides can be arranged over images of keys in a "home row" of the keyboard (i.e., "A", "S", "D", "F", "J", "K", and "L" keys). A secondary guide can be arranged over an image of a key rendered in a row above and/or a row below the home row. The secondary guide can define an arc, with a focus corresponding substantially to the primary guide. For example, the secondary guide can be arranged over a "Y" key that is selected by an index finger with the home position corresponding to the "J" key, and the secondary guide can include an arced boundary with the focus of the arc corresponding to the "J" key. Thus, when the user transitions his index finger from the "J" key to the "Y" key, the secondary guide can tactilely distinguish the "Y" key on the tactile surface and define a boundary for movement of the index finger from the "J" key to the "Y" key. Likewise, the secondary guide arranged over the "U" key can define an arced ridge with a focus of the arc corresponding to the primary guide of the "J" key. Thus, when the user transitions his index finger from the "J" key to the "U" key, the secondary guide can tactilely distinguish the "U" key on the tactile surface and guide the index finger on to the "U" key.

The tactile interface can, therefore, function to reinforce proper typing techniques. Likewise, the images of keys displaying other home row symbols (i.e., "A", "S", "D", "F", "K", "L" and ":") can correspond to a hemispherical protrusion that function as primary guides to indicate the location of each key. Additionally or alternatively, the primary guide for the images of the "J" and the "F" key can include an additional hemisphere guide to indicate a "home position" for fingers resting on the tactile surface over a virtual keyboard. For example, the "F" key can correspond to a primary guide defining two hemispherical deformations. The "R" key can correspond to a secondary guide defining a single oblong deformation. The images of non-home row keys can correspond to secondary guides defining arced protrusions from the tactile interface with foci corresponding to the primary guides that, according to proper typing techniques, can be used to select adjacent images of keys, the secondary guides, and, thus, providing tactile confirmation of the location of the portion of the tactile layer corresponding to the adjacent images of the keys and guiding the user's finger to locations on the tactile surface corresponding to the keys.

3. Tactile Layer

The tactile layer can be integrated in a computing device, an aftermarket device, or a peripheral device. The tactile layer can be arranged over a display rendering a virtual or static keyboard in order to provide tactile guidance for input regions of the display. Thus, the primary guide and secondary guide can substantially correspond to input regions on the display. Alternatively, the primary guide and the secondary guide can be independent of the input regions and, thus, the virtual or static keyboard rendered by the display. The tactile layer can be substantially transparent, translucent, opaque, or any combination thereof. For example, a first portion of the tactile layer substantially opaque and a second portion of the tactile layer can be substantially transparent. The tactile layer can be made of acrylic, polyurethane, polycarbonate, alkali-aluminosilicate sheet toughened glass, electroactive polymer, borosilicate glass, or any other material suitable. Additionally, the tactile layer can include or can be coupled to a capacitive, resistive, optical, or other touch sensor and can, thus, function as a touchscreen for the computing device. Alternatively, the tactile layer can be arranged over an integrated touchscreen in the computing device as an aftermarket tactile layer for the computing device. The tactile layer can define primary guides and secondary guides, which define tactilely-distinguishable features indicating an input region on the tactile layer.

The tactile layer defines the primary guide, the secondary guide, and the peripheral region. The primary guide and the secondary guide are tactilely distinguishable from the peripheral region. The tactile layer can define an intransient primary guide and an intransient secondary guide, both tactilely distinguishable from the peripheral region. The intransient primary guide and intransient secondary guide can be substantially rigid and substantially resist deformation under an applied external force (e.g., a finger pressing on the intransient primary guide and intransient second guide). For example, the tactile layer can include an array of solid hemispherical and convex nodules that define the intransient primary guide and the intransient secondary guide. When the user presses on the nodules with the finger into the tactile layer, the solid nodule can substantially maintain a hemispherical and convex form.

Alternatively, the tactile layer can define a transient primary guide and a transient secondary guide that can transiently deform from a first configuration to a deformed configuration. In one example, the tactile layer defines a pyramid-shaped deformation that protrudes from the tactile layer, the deformation defining the primary guide. The pyramid-shaped deformation can include an elastic membrane cooperating with the tactile layer to enclose a cavity. The cavity can be filled with fluid (e.g., air, water, silicon oil, etc.) and enclose a spring that supports the elastic membrane, etc. In this example, when the user depresses the deformation, the elastic membrane can stretch and the deformation can deform. Thus, the deformation can define the transient primary guide. Likewise, the tactile layer can define transient primary guides and transient secondary guides that include an elastic or flexible membrane supported by fluid or other compressible entity (e.g., a spring) in an expanded setting substantially raised above the peripheral region. The elastic or flexible membrane can deform and flex in response to an applied pressure.

Figure 3:
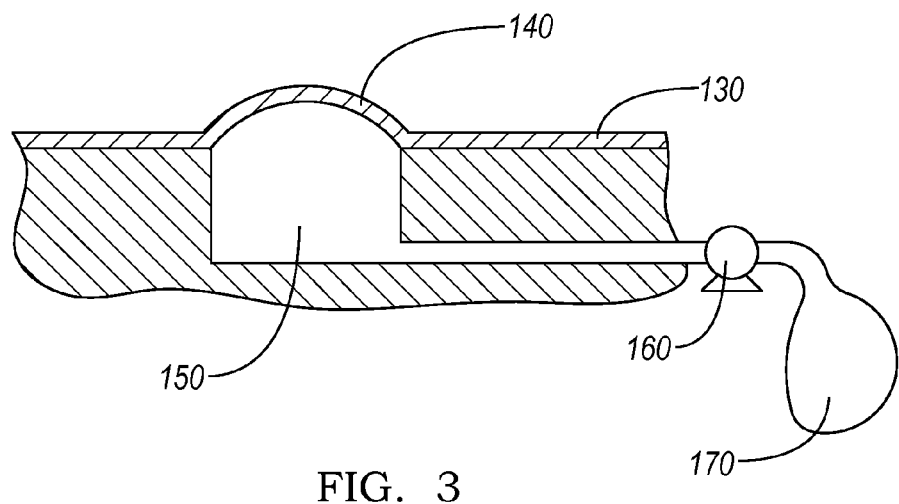
FIG. 3 is a schematic representation of one implementation of the tactile interface.
Figure 4:
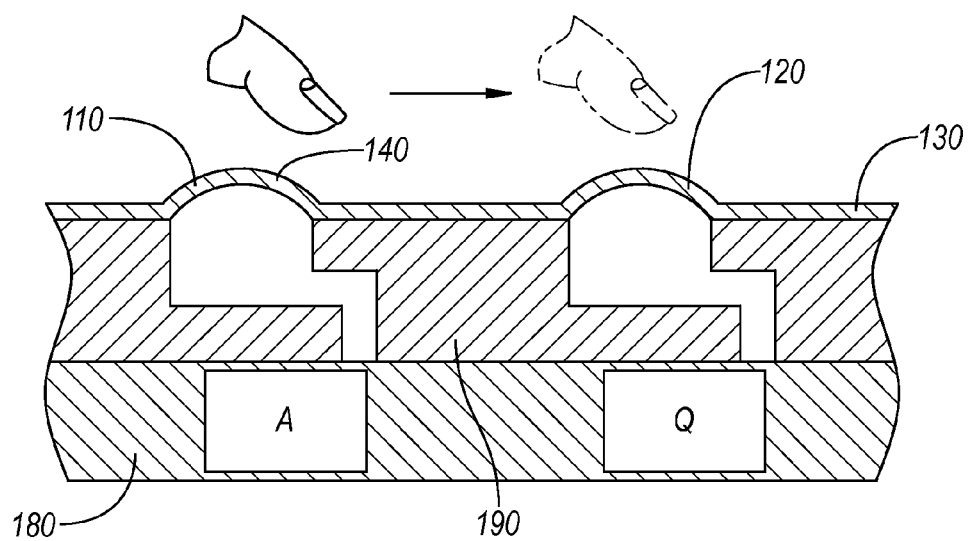
FIG. 4 is a flowchart representation of one implementation of the tactile interface.

Similarly, the tactile layer can include a substrate, a deformable region, and the peripheral region adjacent the deformable region and coupled to the substrate opposite the tactile layer, the substrate defining a fluid channel and cooperating with the deformable region to define a variable volume filled with fluid, as shown in FIGS. 3 and 4. A displacement device (e.g., a pump) fluidly coupled to the fluid channel can displace fluid between the variable volume and a reservoir fluidly coupled to the displacement device, thereby transitioning the deformable region between an expanded setting substantially elevated above the peripheral region and a retracted setting substantially flush with the peripheral region. Generally, the tactile layer can define one or more deformable regions operable between the expanded and retracted settings to intermittently define tactilely distinguishable formations over a surface, such as over a touch-sensitive digital display (e.g., a touchscreen), such as described in U.S. patent application Ser. No. 13/414,589. Thus, the displacement device can transition the deformable region into the expanded setting to, thus, form a primary guide. The displacement device can similarly transition a second deformable region into the expanded setting to, thus, form a secondary guide. Likewise, the displacement device can transition the deformable region into the retracted setting substantially flush with the peripheral region, thereby eliminating the guides and yielding a substantially flush tactile surface. Additionally or alternatively, the displacement device can transition the deformable region into any other retracted setting, wherein the deformable region can be offset below (e.g., into the variable volume). For example, the deformable region in the retracted setting can define a primary guide (and/or the secondary guide).

3.1. Primary Guide

The primary guide can define a tactilely distinguishable feature, such as a bump, a divot, a textured region, etc., that tactilely indicates to the user a particular location on the tactile surface. The primary guide can be of any shape and size suitable to tactilely distinguish a location of the tactile interface, such as a crescent vertically offset from the peripheral region, a raised arc, a linear ridge, a pyramid, etc. The primary guide can also include a plurality of tactilely distinguishable features, such as dots, divots, and/or other textured patterns. The location of the primary guide can correspond to a rendered virtual image such that the primary guide tactilely distinguishes the location of the rendered virtual image. Thus, the primary guide can be arranged substantially over or adjacent the rendered virtual image. The primary guide can be static or dynamic, as described above. The primary guide can further define a set of secondary guides within a distance of the primary guide, each of the set of secondary guides spatially related to the primary guide.

In one implementation, the primary guide can be defined by the deformable region adjacent the peripheral region in the dynamic tactile layer. The displacement device can transition the deformable region between the expanded setting and the retracted setting such that the deformable region is offset above the peripheral region in the expanded setting and is substantially flush with the peripheral region in the retracted setting. Alternatively, the displacement device can transition the deformable region between a depressed setting substantially below the peripheral region and an expanded setting in which the deformable region is substantially flush with the peripheral region.

Figure 6:
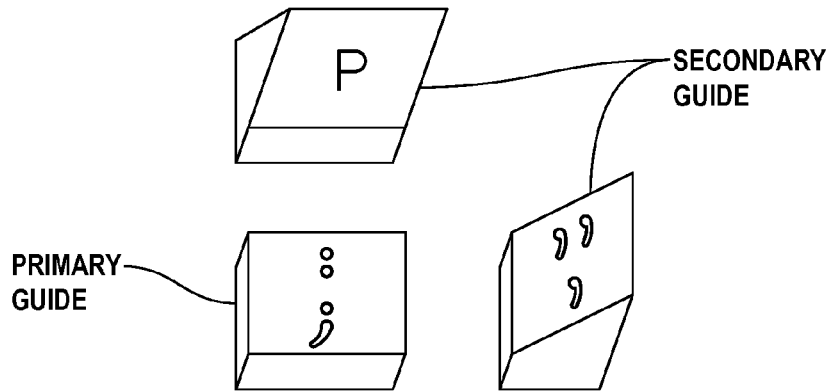
FIG. 6 is a schematic representation of one implementation of the tactile interface.

In one example, as shown in FIG. 6, the primary guide can define a flat-top button as described in U.S. Pat. No. 8,199,124, which is incorporated herein in its entirety by this reference. The flat-top button mimics the mechanically actuated keys of a computer keyboard as a plateau. When the user presses on the primary guide with the finger, the flat-top button can transition from the expanded setting to the retracted setting. The primary guide can define a flat-top button with a top surface substantially parallel the tactile layer. Alternatively, the primary guide can define a flat-top button with a top surface oriented at an angle relative the tactile layer. For example, a primary guide can be arranged over a display rendering a virtual image of a ":/;" key of a virtual keyboard. A user interacting with the virtual keyboard uses a pinky finger to select the ":/;" key. In order to select adjacent keys with the pinky finger, the pinky generally transitions right to the adjacent keys (e.g. a "return" key or a "?" key). Thus, the top surface of the flat-top button can be oriented at an angle relative the tactile layer, wherein the top surface pitches to the right, thereby directing the pinky finger toward the adjacent keys.

The flat-top button can also include an additional, tactilely-distinguishable feature vertically offset above and/or below a surface of the flat-top button. For example, the primary guide can define an oblong bar vertically offset above the top surface of the flat-top button.

In another implementation, the primary guide defined by a deformable region can transition to the expanded setting in response to an event (e.g., detected contact with the tactile layer) at the computing device. For example, a touch sensor coupled to the tactile interface can detect a contact by the finger with the tactile layer. In response to the contact, the displacement device (e.g., a pump) can displace fluid from the reservoir into the variable volume, thereby expanding the deformable region and yielding the primary guide.

Likewise, the primary guide defined by a deformable region can transition to the retracted setting in response to an event (e.g., a detected transition from the primary guide or contact with the secondary guide). For example, in response to detected contact with the secondary guide, the displacement device can displace fluid from the variable volume, thereby retracting the deformable region and yielding a flush surface of the tactile layer.

The primary guide can additionally or alternatively include a rigid, static, and tactilely distinguishable feature substantially resistant to deformation by an applied force (e.g., pressure applied by the finger). In one example, the primary guide can include a polycarbonate torus vertically offset above the peripheral region.

The primary guide can also include any one or any combination of the preceding implementations or examples. Furthermore, the primary guide can be of any other form. Thus, the primary guide can be transiently or permanently formed over the tactile surface in any other suitable way.

3.2 Secondary Guide

Figure 2:
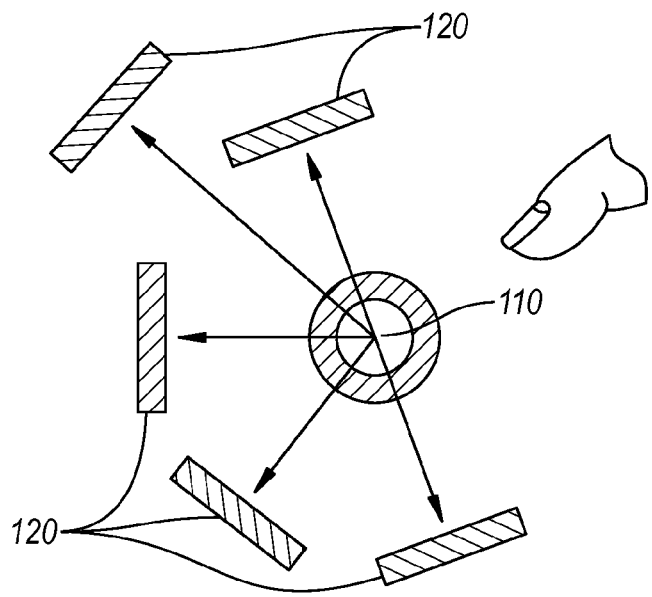
FIG. 2 is a schematic representation of one implementation of the tactile interface.

The secondary guide can define a tactilely distinguishable feature that indicates a peripheral location adjacent the primary guide on the tactile layer and guides the user's finger to the peripheral location as shown in FIG. 2. The secondary guide can be arranged adjacent to a location of a secondary rendered virtual image related to the first rendered virtual image and within a distance from the first rendered virtual image. For example, the location of the secondary rendered virtual image can be defined within an average human finger length or range of motion of the location of the primary rendered virtual image, such that a human finger can transition from the primary guide to the secondary guide without substantially moving a hand attached to the human finger. The secondary guide can be arranged over and/or adjacent the location of the secondary rendered virtual image. The secondary guide can define a tactilely distinguishable feature vertically offset above and/or below the peripheral region, such as a crescent, an arc, an oblong ridge, a divot, etc. Alternatively, the secondary guide can be arranged over a location substantially independent and decoupled from the location of the secondary rendered virtual image.

Generally, the secondary guide can function to guide the finger from a first location corresponding to a location on a virtual keyboard to a second location corresponding to a second location on the virtual keyboard by providing a tactile indicator of the second location and endpoint for transition between the first location and the second location. When a user types on a laptop keyboard or other mechanically-actuated keyboard with physical keys, the user rests each of ten fingers between keys within the home row and the spacebar. Thus, when the user selects a key within the home row positions (e.g., "A", "S", "D", "F", "J", "K", "L", and ":"), the user depresses the key substantially over or adjacent the center of the key with a corresponding finger. However, when the user selects a second key outside the home row positions (e.g., "G", "H", "Y", etc.), the user reaches the finger from the key within the home row to the second key. Thus, the finger can stretch or move from the home row to contact the second key outside the home row. The secondary guide can, thus, provide tactile guidance to the user as the user contacts the second key outside of the home row upon the end of a transition from the corresponding key in the home row.

In one implementation, as shown in FIG. 6, the secondary guide can define a flat-top button with the top surface of the flat-top button arranged at an angle relative the tactile layer. For example, the angle can be such that the top surface of the flat-top button pitches toward the primary guide. Thus, the angle can substantially prevent the finger from moving beyond the secondary guide when transitioning between the primary guide and the secondary guide.

In some implementations, one or more secondary guides can be placed on the tactile surface for different fingers or thumbs of a user, to provide the user with a more convenient tactile layer configuration for entering data through the tactile interface. For example, a set of secondary guides can be positioned on a right side of the tactile interface as well as the left side of the tactile interface, allowing a user to engage a device through the tactile interface with either fingers or a thumb of a right hand or the fingers or thumb of the left hand. This can be advantageous for providing a tactile interface that is equally convenient for users that type on a mobile device through tactile layer using a left hand as well as users that type information into a mobile device through the tactile layer with their right hand. When positioned for the left hand, the secondary guides can be positioned about the primary guide so that the range of a user's thumb can extend to the secondary guides. For example, a thumb will usually move across a tactile interface by rotating the thumb from the hand, where the pivot point of the thumb is located at the lower left corner of the device. When a thumb for a left hand is engaging the keyboard from this position, it can swipe up to the left and down to the right from a resting position at the primary guide on the tactile layer. In some implementations, the secondary guides can be positioned such that the left thumb can swipe up to the left and reach a secondary guide at that position, which can correlate to a top of the keyboard or upper left key of the keyboard, a particular key in the keyboard, or some other location within a keyboard. Additionally, the secondary guides can be positioned such that the left thumb can swipe down to the right and reach a secondary guide at that position, which can correlate to a bottom of the keyboard, a particular key in the keyboard, or some other location within a keyboard.

In an implementation involving a device that can be held in one hand, such as for example a smart phone, when a finger is being used from the left hand to enter data, the device itself will probably be held with the right hand. In this implementation, the finger can swipe up to the left and down to the right from a resting position at the primary guide. In some implementations, the secondary guides can be positioned such that a finger from the left hand can swipe up to the left and reach a secondary guide at that position, which can correlate to a top of the keyboard or an outer left edge of the keyboard, a particular key in the keyboard, or some other location within a keyboard. Additionally, the secondary guides can be positioned such that a finger from the left hand can swipe down to the right and reach a secondary guide at that position, which can correlate to a bottom of the keyboard, a particular key in the keyboard, or some other location within a keyboard. The positioning of the secondary guides can be slightly rotated as a whole counterclockwise to accommodate a situation where the finger on the left hand is aligned a bit more parallel with the device rather than at a forty-five degree angle with the device as a thumb would likely be when entering data through the tactile interface onto a keyboard of the device.

When a thumb for a right hand is engaging the keyboard from the bottom of the device, pivoting from a point near the bottom right corner of the device, the thumb can swipe up to the right and down to the left from a resting position at a primary guide located inward from the lower right corner of the device. In some implementations, the secondary guides can be positioned such that the left thumb can swipe up to the right and reach a secondary guide at that position, which can correlate to a top or outer edge of the keyboard, a particular key in the keyboard, or some other location within a keyboard. Additionally, the secondary guides can be positioned such that the left thumb can swipe down to the left and reach a secondary guide at that position, which can correlate to a bottom of the keyboard, a particular key in the keyboard, or some other location within a keyboard.

In an implementation involving a device that can be held in one hand, such as for example a smart phone, when a finger is being used from the right hand to enter data, the device itself will usually be held with the left hand. In this implementation, the finger can swipe up to the right and down to the left from a resting position at the primary guide. In some implementations, the secondary guides can be positioned such that a finger from the right hand, such as an index finger, can swipe up to the right and reach a secondary guide at that position, which can correlate to a top key or outer right key of the keyboard, a particular key in the keyboard, or some other location within a keyboard. Additionally, the secondary guides can be positioned such that a finger from the right hand can swipe down to the left and reach a secondary guide at that position, which can correlate to a bottom of the keyboard, a particular key in the keyboard, or some other location within a keyboard. The positioning of the secondary guides, in some instances, can be slightly rotated as a whole clockwise to accommodate a situation where the finger is aligned a bit more parallel with the device rather than at a forty-five degree angle with the device as a thumb would likely be positioned when entering data through the tactile interface onto a keyboard of the device.

In another implementation, the secondary guide can transition to an expanded setting in response to an event at the primary guide (e.g., depression of the primary guide). For example, the touch sensor of the tactile interface can detect a contact by the finger with the primary guide. In response to the contact, the displacement device (e.g., a pump) can displace fluid from the reservoir into the variable volume, thereby expanding the deformable region and yielding the secondary guide. Likewise, the secondary guide defined by a deformable region can transition to the retracted setting in response to an event (e.g., detected transition from the secondary guide to the primary guide or contact with the primary guide).

In some implementations, multiple corresponding sets of primary guides and secondary guides can be implemented on the tactile interface. Primary guides can be positioned at several locations on a tactile interface. The different positions can be associated with different keyboards, such as, for example, keyboards in a first rotational configuration for the device, a keyboard that appears for a second rotational configuration for the device, positions suited for different users such as those that are right-handed and those that are left-handed, for a configuration best suited for manipulating the device with one hand using a thumb, for a configuration best suited for manipulating the device with one hand using a finger, for a configuration best suitable for manipulating the device with both hands, and other configurations. For each configuration, when the user presses down on the tactile interface at the point of one of the primary guides, a number of secondary guides associated with that primary guide would expand. Likewise, the secondary guide defined by a deformable region can transition to the retracted setting in response to an event. The user can utilize the secondary guides associated with the engaged primary guides, and would not detect any other secondary guides that are associated with other primary guides, as they would not be expanded but rather are flush with the surface with the tactile layer until a user engages a primary guide associated with the particular secondary guide.

The secondary guide can additionally or alternatively include a rigid, static, and tactilely distinguishable feature substantially resistant to deformable by an applied force (e.g., pressure applied by the finger).

The secondary guide can include any one or combination of the preceding implementations and examples. Furthermore, the secondary guide can be of any other form. Thus, the secondary guide can be transiently or permanently formed over the tactile surface in any other suitable way.

Figure 7:
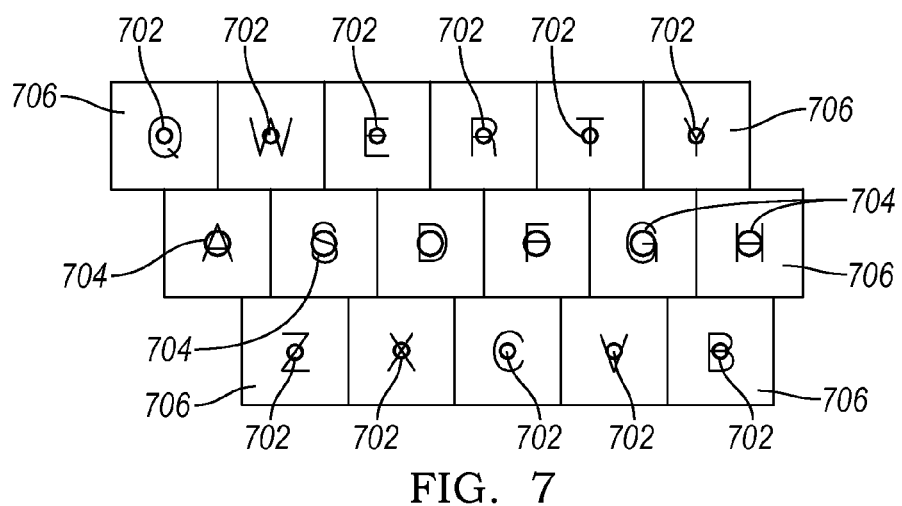
FIG. 7 is a schematic representation of one implementation of the tactile interface.

In some embodiments, a primary guide and one or more secondary guides can have similar shapes but different sizes. FIG. 7 illustrates a tactile interface with primary guides having a first shape and a first size and secondary guides having the same shape type but in a different size. In particular, the primary guides 704 in FIG. 7 are circular. The primary guides 704 can appear on one or more keys in a keyboard, such as, for example, over a letter or symbol. The secondary guides 702 having the smaller sized circles are displaced in different positions on the keyboard than the positions associated with the primary guides 704 having the larger sized circle. The secondary guides 702 are smaller circles than circles which form the primary guide, with the smaller circles placed on outer rows of keys 706 while the larger circles are placed on the home row of keys 706. Providing guides of similar sizes but different shapes can enable a user to quickly find a home position on a keyboard by placing fingers over the larger primary guides. As a user types and enters data, the user can reach out to the secondary guides having smaller sized shapes that are similar to the primary guides (for example, the same circular, square, rectangular, slash, arc, or other shape implementing the primary guide). In FIG. 7, each key in the keyboard includes either a secondary guide or a primary guide, but other implementations of a tactile interface are possible when utilizing same shape but different size primary guides and secondary guides. For example, in a QWERTY keyboard, the large common shaped primary guides can be placed at home keys associated with the letters F and J. The smaller common shaped secondary guide can be placed at border keys such as a Q, Z, P, and forward slash "/".

Though only two different sizes of a guide are shown in FIG. 7, more than two sizes can be utilized on a tactile interface. For example, each row away from the home row can have a different size for the particular shape, making it easier for a user to tactically feel which row the user's fingers are on. For example, a primary guide of a first size, a largest size, can be placed on each key, selected keys, or only the home keys of the home row. In the row above the home row, secondary guides having a second size, smaller than the largest size, but having the same shape type can be placed on each key, one or more selected keys of that row, or on the outer keys on the outer edges of the row. In the row above that row, which can include numerals and characters, a secondary guide of a third size, being smaller than both the large size primary guides and the first row of secondary guides, but having the same shape type as the other two rows, can be placed on one or more of the keys, such as, for example, the outer most keys of that row, every key of the row, or selected keys of that row.

Figure 8:
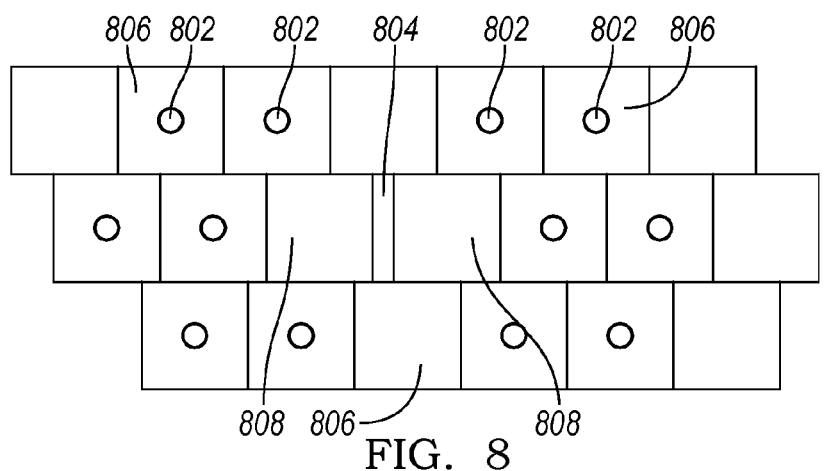
FIG. 8 is a schematic representation of one implementation of the tactile interface.

In an embodiment, guides can be placed in positions on the tactile interface other than the center of a particular key. For example, a primary guide, secondary guide, or both can be implemented outside of the keyboard, within the keyboard between two or more keys, or in some other location. FIG. 8 illustrates and example of a primary guide placed between a keys of a rendered virtual keyboard. The tactile interface includes primary guides 802 located on keys of a rendered virtual keyboard and a primary guide 804 located between two keys of a rendered virtual keyboard. Though only one primary guide placed between keys is illustrated, any number of primary guides could be placed between two or more adjacent keys 806. When placed between keys, the primary guide can be shaped as a relatively thin extruding rectangle or strip that extends between the position where two keys are located, not associated with or positioned upon a single particular key but rather positioned between the borders of two adjacent keys on a keyboard. By having a position between two adjacent keys, a user can detect the primary guide when touching either adjacent key. The advantage of using a primary guide between two adjacent keys is that a user can confirm navigation on either of the two adjacent keys while only requiring the fluid to provide a singular primary guide.

A primary guide between adjacent keys can be placed in several locations on a keyboard. For example, the primary guide can be positioned to extend vertically between two home keys, such as the G and H keys, to allow a user that types with both hands to easily determine whether the fingers are on the keyboard. The primary guide can also be positioned to extend horizontally above a home row of keys, below a home row of keys, or both. By placing the primary guide horizontally along more than one key, a user will quickly be able to determine that his fingers are on the home row as well as return his or her fingers to the home row after depressing other keys. Similarly, a vertical primary guide can be used to find a boundary between letters and numbers, for example, when it is placed below a numerical row of keys to rows above a home row of keys in a typical keyboard. Some typists are not able to accurately select numerical keys when they extend their fingers from the home row to the numerical row, being unable to determine whether or not they reach the numerical keys as well as reaching the appropriate numerical key, mostly because these keys are not used as often as the letter keys. By providing a horizontally extending primary guide between the numerical row and the uppermost letter row of keys, user would easily be able to determine when their fingers extended beyond the uppermost row of letters and were placed on the numerical row of keys based on the position of the horizontal primary guide.

In some implementations, a key that does not have any guide may assist a user tacitly navigate a keyboard. In the tactile interface of FIG. 8, keys 808 are positioned between a primary guide between two keys and primary guides located on keys. Thus, keys 808 stand out from keys adjacent to them because they do not have any guide on them. When a user is feeling the surface of the device and feels the portion of the tactile interface without guides, the user will know that they are on the particular keys associated with no guide.

Figure 9:
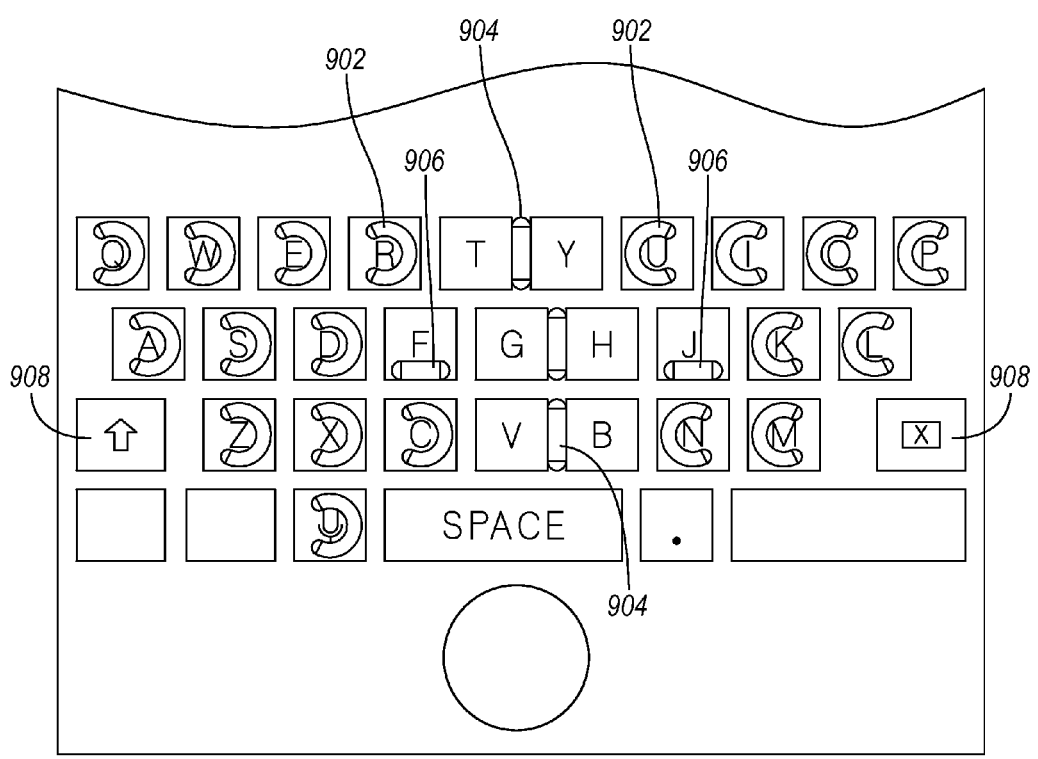
FIG. 9 is a schematic representation of one implementation of the tactile interface.

Using a primary guide that extends between keys of a keyboard can also help to implement a tactile interface for use on smaller keyboards, such as those used in mobile phones and other smaller handheld devices. FIG. 9 illustrates a tactile interface suitable for use with a mobile device keyboard and utilizing primary guides that extend between keys in multiple locations. A horizontal primary guide is placed between the centermost keys in each row of the mobile device keyboard. These vertically extending primary guides that extend between two adjacent keys allow a user to quickly determine the center of the keyboard. In this embodiment, the tactile interface includes a deformable region shaped as a thin rectangle positioned between two adjacent keys on the keyboard of the mobile device.

The tactile interface of FIG. 9 also includes horizontally extending primary guides positioned between two adjacent keys. The tactile interface of FIG. 9 includes primary guides 902 on rendered virtual keys, primary guides 904 placed between rendered virtual keys, horizontally extending guides 906, and graphical user interface elements 908. The horizontally extending guides 906 are positioned at traditional home keys F and J, allowing a user to identify the locations of these home keys in order to navigate from the home keys to other keys on the keyboard. Because the keys on a mobile device keyboard are often very small, less than half the size of the keys on a typical keyboard for a desktop computer, providing a primary guide that does not take up much surface area yet still indicates a position of a home key can be desirable.

In addition to the vertical and horizontal primary guides positioned between adjacent keys, the mobile device keyboard can include one or more secondary guides. Each secondary guide can be positioned on a particular key of the keyboard, and can align on the same row as a primary guide, or same column as a primary guide. In some implementations, the secondary keys can be positioned only at the outermost keys on each row, to assist the user in determining the location of these outermost keys when typing information into the keyboard through the tactile interface. The shape of the secondary guides can be any shape suitable for use on a small keyboard, such as, for example, a small circle or square, a half circle, or some other shape.

The one or more secondary guides can expand or retract in several configurations. It can be more convenient to have the secondary keys from the tactile interface surface only when needed. In this implementation, a secondary guides can only appear under certain conditions. For example, when a row of numerical keys is needed, a horizontal primary guide located on the numerical row, for example, near the middle of the numerical row of and between two keys on the numerical row, can be depressed to cause the row of secondary guides positioned with the numerical row to and appear on the tactile surface. Similarly, the secondary guides can be deflated to retract back into the tactile layer based on other user input or another event. In addition to placing secondary guides on keys of the numerical row, pressing the primary key located in the middle of the numerical row and between two adjacent keys in the numerical row can cause a second secondary guide to appear that extends horizontally between the numerical row and the row underneath the numerical row. The extended horizontal secondary guide can help a user navigate between letter keys and numerical keys on a small keyboard provided by a mobile device. When the secondary guide that extends horizontally between the numerical keys and the letter keys is no longer needed, the secondary guides can be deflated to retract back into the tactile layer based on other user input or some other event.

3.3 Transition Guide

One variation of the tactile interface can further include a transition guide. The transition guide includes a tactilely distinguishable feature or set of features that tactilely direct(s) the user's finger from the primary guide toward the secondary guide. The transition guide can include tracks, ridges, bumps, a textured surface, depressions, etc. that tactilely distinguish a path between the primary guide and the secondary guide from non-path portions of the tactile layer (e.g., the peripheral region). Additionally or alternatively, the transition guide can function to prevent the finger from deviating from the path. The transition guide can be static or dynamic (e.g. deformable regions) and, thus, define rigid and/or transient features that tactilely distinguish the path between the primary guide and the secondary guide.

Figure 5A:
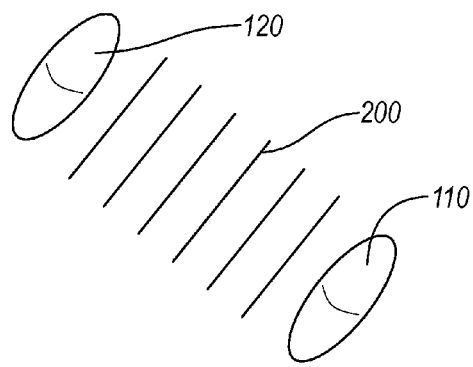
FIGS. 5A, 5B, 5C, and 5D are schematic representation of one variation of the tactile interface.
Figure 5B:
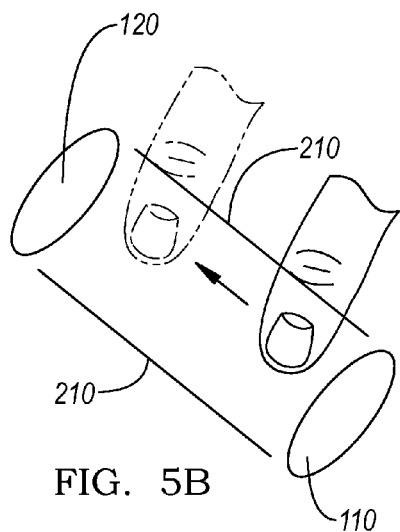
Figure 5C:
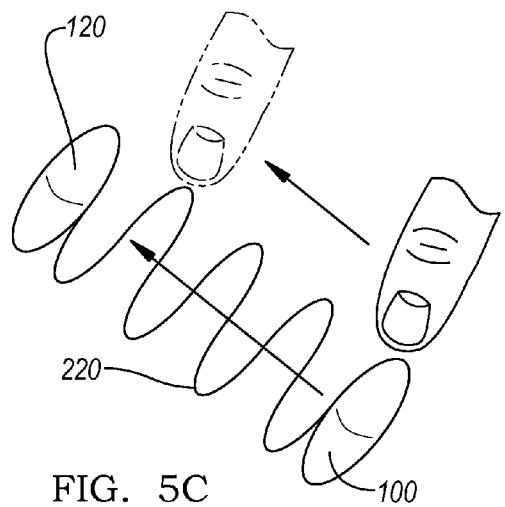
Figure 5D:
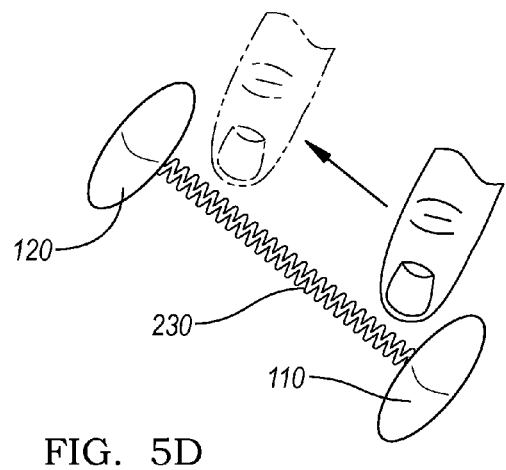

In one implementation of the variation, the transition guide can include a single track vertically offset above the tactile layer, the transition guide defining a path between a primary guide and a secondary guide. The track can be a substantially linear, curvilinear, and/or non-linear. For example, the single track can define a linear path between the primary and secondary guide, the linear path corresponding to a shortest distance between the primary guide and the secondary guide or a natural path of a finger from the primary guide to the secondary guide, as shown in FIG. 5D.

In this example, the finger of the user can substantially follow the track from the primary guide to the secondary guide by running the finger over or parallel to the track. Alternatively, the single track can define a sinuous or zigzag path, as shown in FIG. 5C, between the primary guide and the second guide. The finger can transition between the primary guide and the secondary guide by traversing over bends of the sinuous path substantially orthogonal to the path. Alternatively, the finger can follow the sinuous path by running the finger over or parallel to the track.

In a similar implementation, the transition guide can include a depressed single track vertically offset into the tactile layer. The depressed single track can be linear, curvilinear, and/or non-linear. Additionally or alternatively, the single track can be discontinuous (e.g., defining a dashed or dotted path).

In another implementation shown in FIG. 5B, the transition guide can include multiple tracks vertically offset above and/or below the tactile layer. For example, two tracks vertically offset above the tactile layer can define boundaries of a path between the primary guide and the secondary guide, the boundaries constraining the finger transitioning between the primary guide and the secondary guide to the path. The path can be linear, curvilinear, and/or non-linear. Additionally or alternatively, the tracks can be discontinuous (e.g., defining dashed or dotted paths).

In another implementation, the transition guide can include a textured path between the primary and secondary guide. The textured path can include tactilely distinguishable features that differentiate the path from the peripheral region. The textured path can include features vertically offset above and/or below including, for example, a plurality of dimples, a cross-hatched pattern, dots, ridges, etc., or any combination thereof as shown in FIG. 5A. For example, the textured path can include a plurality of ridges arranged between the primary and secondary guides and substantially perpendicular to a path traversed by a finger transitioning between the primary and secondary guides.

In one implementation of the variation, the transition guide can function to reinforce proper typing technique by defining a path corresponding to a recommended path between the primary guide and the secondary guide. For example, the tactile interface can be arranged over a display rendering a virtual keyboard. The primary guide can be arranged substantially over a center of a virtual key representing an "L" key. The secondary guide can be arranged over an upper right corner of a virtual key representing a "P" key. The transition guide can define an arced path between the primary guide, a concavity of the arc proximal a virtual key representing the ":/;" key.

In one example of the variation, the transition guide can define the path between the primary guide and the secondary guide based on historical paths traversed by the finger between the primary guide and the secondary guide. Accordingly, the transition guide can account for human behavior patterns, such as what path the user typically traverses when moving the finger between the primary guide and the secondary guide. The user, for example, may typically type the letter "Z" with a left-hand ring finger as opposed to a suggested left-hand pinky finger. Thus, the transition guide can guide the left-hand ring finger from the primary guide corresponding to an image of an "S" key to the secondary guide corresponding to an image of the "Z" key.

In another example, the transition guide in conjunction with the primary guide and six secondary guides can form a substantially asterisk-shaped and tactilely distinguishable configuration on the tactile interface. In particular, the primary guide can define a torus vertically offset above the tactile layer. The transition guide can define six tracks vertically offset above the tactile layer and extending horizontally from the primary guide radially away from the primary guide toward secondary guides. The secondary guides can define circular depressions into the tactile layer. In this example, the primary guide, the secondary guides, and the transition guide can function as a pointing stick (e.g. an isometric joystick) or a trackpad for controlling a virtual rendering of a cursor on a computer display. The primary guide, the secondary guides, and the transition guides can define tactile reference features. This example can also function as a substitute for arrow keys on a tactile interface.

In some implementations, the tactile interface may provide haptic feedback to a user. For example, if a user applies force to a selected portion of the tactile interface, which may or may not include a primary or secondary guide, the tactile interface may provide feedback in the form of a buzz or vibration, an audio alert, a visual alert such as a quick LED signal, or some other type of feedback. A haptic sensor may indicate that a user's finger or thumb is in a particular place, with or without using a primary or secondary guide.

The transition guide can include any one or combination of the preceding implementations and examples. Furthermore, the transition guide can be of any other form. Thus, the transition guide can be transiently or intransiently formed over the tactile surface in any other suitable way.

As a person skilled in the art will recognize from the previous detailed description and from the figures and claims, modifications and changes can be made to the preferred embodiments of the invention without departing from the scope of this invention as defined in the following claims.

I claim:

1. A dynamic tactile interface for a computing device, comprising:
   a substrate defining a fluid channel and a fluid conduit fluidly coupled to the fluid channel;
   a tactile layer defining a primary guide and a secondary guide, the primary guide tactilely distinguishable from an adjacent peripheral region and arranged adjacent a first input region of a touch-sensitive surface, the secondary guide tactilely distinguishable from the adjacent peripheral region, arranged adjacent a second input region of the touch-sensitive surface, and defining a peripheral boundary of a range of motion of a finger or thumb moving between the primary guide and the secondary guide; and
   a displacement device causing the tactile layer to transition from the retracted setting to the expanded setting and from the expanded setting to the retracted setting.

2. The dynamic tactile interface of claim 1, wherein the primary guide is positioned on the tactile layer in a position associated with rendered virtual image provided through a display of the computing device.

3. The dynamic tactile interface of claim 1, wherein the primary guide defines a flat-top button positioned above rendered virtual image.

4. The dynamic tactile interface of claim 1, wherein the rendered virtual image includes home keys of a keyboard.

5. The dynamic tactile interface of claim 1, wherein the secondary guides are positioned along a swipe path for a thumb or finger moving from the primary guide to the secondary guide.

6. The dynamic tactile interface of claim 1, wherein the primary guide transitions to the expanded setting in response to an event at the computing device, the displacement device displacing liquid from a reservoir into a variable volume displaced below the deformable region to expand the region.

7. The dynamic tactile interface of claim 1, wherein the primary guide transitions from the expanded setting to the retracted setting in response to an event at the computing device, the displacement device displacing liquid from a reservoir into a variable volume displaced below the deformable region to expand the region.

8. The dynamic tactile interface of claim 1, wherein the secondary guide is arranged adjacent to a secondary rendered virtual image.

9. The dynamic tactile interface of claim 1, further comprising a second primary guide and a second secondary guide, the first primary guide and the first primary guide positioned within a distance of each other suitable for a first finger or thumb of a user to engage both the first primary guide and the first primary guide, the second primary guide and the second secondary guide positioned within a distance of each other suitable for a second finger or thumb of a user to engage both second primary guide and the second secondary guide.

10. The dynamic tactile interface of claim 9, wherein the first primary guide and the first secondary guide expand in response to a first event at the computing device and the second primary guide and the second secondary guide expand in response to a second event at the computing device.

11. The dynamic tactile interface of claim 9, wherein the first finger or thumb is on a right hand of the user and the second finger or thumb is on the left hand of the user.

12. The dynamic tactile interface of claim 1, further including a touch sensor, the touch sensor expanding or retracting the secondary guide in response to detecting contact at the primary guide.

13. The dynamic tactile interface of claim 1, further comprising one or more additional sets of a primary guide and corresponding secondary guide, each set of primary guide and secondary guide selectable and expandable via one or more touch sensors.

14. The dynamic tactile interface of claim 1, wherein the secondary guide includes a rigid, static and tacitly distinguishable feature substantially resistant to deforming.

15. The dynamic tactile interface of claim 1, wherein the primary guide and secondary guide have a similar shape type and different size.

16. The dynamic tactile interface of claim 1, wherein the primary guide is positioned between two adjacent keys in a rendered virtual keyboard.

17. The dynamic tactile interface of claim 1, wherein the secondary guide is positioned between two adjacent keys in a rendered virtual keyboard.

18. The dynamic tactile interface of claim 1, further including a transition guide having tacitly a distinguishable feature that tacitly directs the user's finger from the primary guide to the secondary guide.

19. The dynamic tactile interface of claim 1, wherein the transition guide includes a depressed track vertically offset from the tactile layer.

20. The dynamic tactile interface of claim 1, wherein the transition guide includes multiple depressed tracks vertically offset from the tactile layer.

21. The dynamic tactile interface of claim 1, the displacement device including a fluid vessel and an actuator, the actuator displacing fluid from the fluid vessel into the tactile layer to transition the tactile layer from the retracted setting to the expanded setting and from the tactile layer into the fluid vessel to transition the tactile layer from the expanded setting to the retracted setting.

* * * * *

UNITED STATES PATENT AND TRADEMARK OFFICE
CERTIFICATE OF CORRECTION

| | | |
|---|---|---|
| PATENT NO. | : 9,588,684 B2 | |
| APPLICATION NO. | : 14/815771 | |
| DATED | : March 7, 2017 | |
| INVENTOR(S) | : Yairi | |

It is certified that error appears in the above-identified patent and that said Letters Patent is hereby corrected as shown below:

In the Claims

Column 14, Line 12, Claim 9 "the first primary guide and the first primary guide" should read, "the first primary guide and the first secondary guide"

Column 14, Line 14, Claim 9 "the first primary guide and the first primary guide" should read, "the first primary guide and the first secondary guide"

Column 14, Line 39, Claim 14 "a ridged, static, and tacitly distinguishable feature" should read, "a ridged, static, and tactilely distinguishable feature"

Column 14, Line 50, Claim 18 "having tacitly a distinguishable feature that tacitly directs the users finger" should read, "having a tactilely distinguishable feature that tacitly directs the users finger"

Signed and Sealed this
Twenty-third Day of May, 2017

Michelle K. Lee
*Director of the United States Patent and Trademark Office*